*E. Spencer,*
*Flour Sieve.*
Nº 50,640.          Patented Oct. 24, 1865.
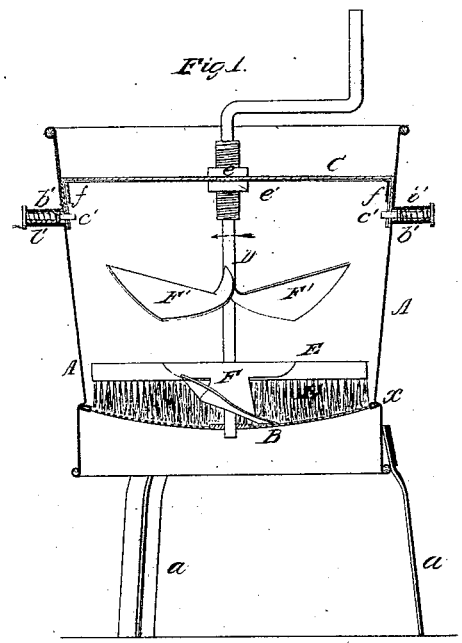
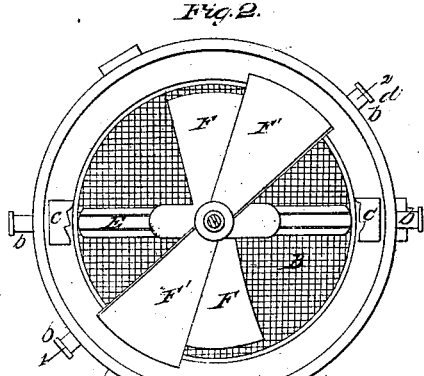 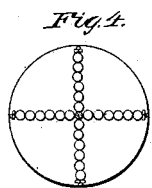
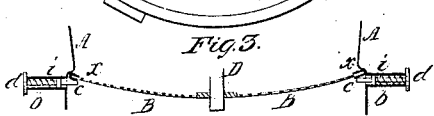

UNITED STATES PATENT OFFICE.

E. SPENCER, OF PHILADELPHIA, PENNSYLVANIA.

FLOUR-SIFTER.

Specification forming part of Letters Patent No. 50,640, dated October 24, 1865.

*To all whom it may concern:*

Be it known that I, E. SPENCER, of Philadelphia, Pennsylvania, have invented an Apparatus for Sifting Flour, &c.; and I do hereby declare the following to be a full, clear, and exact description of the same, reference being had to the accompanying drawings, and to the letters of reference marked thereon.

My invention consists, first, of a casing having a perforated bottom, in combination with a shaft to which are attached certain inclined blades, and a brush or its equivalent, the whole being arranged and operating substantially as described hereinafter, so that flour and other substances introduced into the casing will be forced through the perforations in the bottom by the action of the blades and brush; secondly, in the combination, described hereinafter, of the said casing and shaft, a detachable cross-piece and a detachable perforated plate or sieve, so that all the parts may be removed from the casing when the apparatus is to be cleaned, and so that different plates or sieves may be used with the same casing; thirdly, of certain adjustable nuts or their equivalents combined with the cross-piece and shaft, so that the latter may be elevated or lowered as desired.

On reference to the accompanying drawings, which form a part of this specification, Figure 1 is a sectional elevation of my improved apparatus for sifting flour, &c. Fig. 2 is a plan view; Fig. 3, a sectional view on the line 1 and 2, Fig. 2, showing part of the apparatus.

A is a cylindrical or slightly-tapering casing, which rests on legs $a\ a$, and in which, near the lower edge, is a rib, or shoulder, $x$. Within the lower part of the casing fits a sieve, B, which is held up against the said shoulder $x$ by rods $c\ c$, the latter projecting through the casing and through tubes $b$ secured to the outside of the same, each tube having a spring, $i$, which bears against a collar on the rod and tends to maintain the end of the latter beneath the edge of the sieve B, and on the outer end of each rod is a head or button, $d$. (See Fig. 3.) Across the casing A, near the upper portion of the same, extends a cross-piece, C, the ends of which are turned down and bear against the interior of the casing, and project through staples $f\ f$. Through the casing and through each end of the cross-piece projects a rod, $c'$, which slides in a tube, $b'$, and is maintained at the limit of its inward movement by a spring, $i'$, there being a head on the outer end of each rod.

Through the center of the cross-piece C passes a vertical shaft, D, the upper end of which is formed into a crank-handle, the lower end turning in a plate at the center of the sieve B. On that portion of the shaft E which extends through the cross-piece C is a thread to which are adapted nuts $e\ e'$, the former being above and the latter below the cross-piece.

From the under side of a cross-piece, E, secured to the shaft D, projects a brush, E', which bears lightly on the sieve B, and from the cross-piece E, as well as from the shaft above the cross-piece, project any desired number of vanes or blades, F F F' F', which are bent or inclined, as shown in the drawings.

The apparatus is placed above any suitable receptacle, the flour to be sifted is introduced into the casing, and a rotary motion in the direction of the arrow is imparted to the shaft D. As the shaft revolves the flour is pressed down and the lumps in the same are broken by the action of the blades F' F', while it is spread over the sieve and forced through the same by the action of the blades F F, the brush E cleansing the sieve from all adhering particles, and thus preventing the meshes from becoming clogged.

The lifting of the shaft by the action of the blades is prevented by the nut $e'$, which bears against the under side of the cross-piece. By adjusting the nuts $e\ e'$ the shaft may be lowered as the brush E' wears away, or raised when a new brush is introduced.

The sieve B and the cross-piece C may, at any time, be detached from the casing by drawing back the rods $c\ c$ or $c'\ c'$.

Although I have alluded to this apparatus as being used only for sifting flour, it may be employed with great advantage for straining sauces and other similar materials. A perforated metal plate may be substituted for the sieve B, and the latter may be replaced by one with larger meshes, whenever the nature of the substance operated on requires it. In some instances the brush E may be dispensed with.

In sifters of the ordinary construction, the flavor of an article is frequently impaired by the admixture of some substance previously sifted, particles of which adhere to parts of the apparatus difficult to cleanse. It will be seen that this is avoided in a sifter of the construction above described, where all the parts may be separated from each other and thoroughly cleansed.

Without confining myself to the precise construction and arrangement of the devices herein described,

I claim as my invention and desire to secure by Letters Patent—

1. A casing having a perforated bottom, in combination with a shaft having any desired number of inclined blades and a brush, a detachable perforated plate or sieve, B, and a detachable cross-piece, C.

2. The adjustable nuts $e\ e'$, for the purpose described.

In testimony whereof I have signed my name to this specification in the presence of two subscribing witnesses.

EDWD. SPENCER.

Witnesses:
CHARLES E. FOSTER,
JOHN WHITE.